United States Patent
Sviberg

(10) Patent No.: US 10,384,523 B2
(45) Date of Patent: Aug. 20, 2019

(54) CONVERTIBLE TOP HAVING LINK ARRANGEMENTS FOR ADJUSTING A CONVERTIBLE-TOP ELEMENT

(71) Applicant: Webasto SE, Stockdorf (DE)

(72) Inventor: Magnus Sviberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/639,953

(22) Filed: Jun. 30, 2017

(65) Prior Publication Data

US 2019/0001798 A1 Jan. 3, 2019

(51) Int. Cl.
*B60J 7/20* (2006.01)
*B60J 7/14* (2006.01)
*F16H 21/44* (2006.01)
*B60J 7/06* (2006.01)

(52) U.S. Cl.
CPC ............... *B60J 7/146* (2013.01); *B60J 7/061* (2013.01); *B60J 7/20* (2013.01); *F16H 21/44* (2013.01)

(58) Field of Classification Search
CPC ..... B60J 7/20; B60J 7/028; B60J 7/061; B60J 7/062; B60J 7/146
USPC ..... 206/219, 107.01, 107.16, 107.19, 107.07
See application file for complete search history.

(56) References Cited

U.S. PATENT DOCUMENTS

| | | | | |
|---|---|---|---|---|
| 6,267,433 B1 * | 7/2001 | Bayer | ...................... | B60J 7/061 296/120.1 |
| 6,398,296 B1 * | 6/2002 | Mayer | .................... | B60J 7/0053 296/107.16 |
| 6,428,090 B1 * | 8/2002 | Reinsch | ................. | B60J 7/0053 296/216.08 |
| 6,592,169 B2 * | 7/2003 | Obendiek | ................ | B60J 7/145 296/107.07 |
| 6,926,354 B2 * | 8/2005 | Munsters | ................. | B60J 7/061 296/216.08 |
| 7,063,372 B2 * | 6/2006 | Manders | ................ | B60J 1/1892 296/146.16 |
| 8,764,095 B2 * | 7/2014 | Ritzinger | ............... | B60J 1/1815 296/107.07 |
| 9,114,690 B1 * | 8/2015 | Bowles | ................... | B60R 21/13 |
| 9,283,833 B2 * | 3/2016 | Kopp | ......................... | B60J 7/20 |
| 9,505,293 B2 * | 11/2016 | Bowles | ................... | B60R 21/13 |
| 2002/0158485 A1 * | 10/2002 | Obendiek | ............... | B60J 7/145 296/107.07 |

(Continued)

*Primary Examiner* — Dennis H Pedder
(74) *Attorney, Agent, or Firm* — Fitch, Even, Tabin & Flannery, LLP

(57) ABSTRACT

A vehicle convertible top having a link arrangement on both sides relative to a vertical longitudinal center plane of the convertible-top, link arrangement being mounted on a main bearing fixed, displaces a convertible-top element between a lifted operating position and a lowered storage position. Each link arrangement may have a base link, mounted on the main bearing; a four-joint arrangement having a first adjusting link and a second adjusting link are connected to the convertible-top element; and a coupling element, a component of the four-joint arrangement, to which the base link, the first adjusting link and the second adjusting link are hinged. The link arrangements each may have a backlite link arrangement having a first coupling link hinged to the coupling element, which can be connected to one of the adjusting links via a second coupling link to couple the four-joint arrangement to the backlite link arrangement.

13 Claims, 10 Drawing Sheets

(56) References Cited

U.S. PATENT DOCUMENTS

2003/0052507 A1\* 3/2003 Obendiek ............. B60J 7/1265
296/107.01

\* cited by examiner

CONVERTIBLE TOP HAVING LINK ARRANGEMENTS FOR ADJUSTING A CONVERTIBLE-TOP ELEMENT

TECHNICAL FIELD

The invention relates to a convertible top of a convertible vehicle, comprising a convertible-top linkage which comprises a link arrangement on both of its two sides relative to a vertical longitudinal center plane of the convertible top, said link arrangement being pivotably mounted on a main bearing fixed to the vehicle and serving to adjust a convertible-top element between a lifted operating position and a lowered storage position.

BACKGROUND

A convertible top of a convertible vehicle having a convertible-top element designed as a convertible-top cassette is known from practice and comprises a convertible-top linkage which comprises a link arrangement on both of its two sides relative to a vertical longitudinal center plane of the convertible top, said link arrangement being pivotably mounted on a respective main bearing fixed to the vehicle. The link arrangements are each hinged to the rear-side convertible-top cassette which can be adjusted between a lifted operating position and a lowered storage position. In the lifted operating position, the convertible-top cassette or the roof cassette forms a rear-side corner area of the roof of the respective vehicle formed by the convertible top. In the lowered storage position, the convertible-top cassette is accommodated by a rear-side storage space of the vehicle. The convertible-top cassette delimits a folding-top portion at the rear, which can be unfolded or extended up to a forward cowl of the vehicle so as to span a vehicle interior. When the convertible-top cassette is lowered into the storage position, the folding-top portion is accommodated by the convertible-top cassette. Furthermore, a drive mechanism for the folding-top portion is integrated into the convertible-top cassette.

In the afore-described known convertible top, the convertible top cassette undergoes a displacement in the longitudinal direction of the convertible top or of the vehicle when being adjusted between the storage position and the operating position. In particular in cases when the respective vehicle has a roll cage and a superstructure located at the rear of the vehicle with a brake light, a spare tire or the like, an expansive displacement of the convertible-top cassette during adjustment is not possible because of the constructed space. Furthermore, the convertible top projects deep into the vehicle interior when in its storage position.

SUMMARY OF THE INVENTION

The object of the invention is to provide a convertible top which has a convertible-top element which is mounted on a convertible-top linkage and whose displacement in the longitudinal direction of the convertible top when being adjusted between a lifted operating position and a lowered storage position can be kept small as compared to known convertible tops.

According to the invention, a convertible top of a convertible vehicle is thus proposed which comprises a convertible-top linkage which has a link arrangement on both of its two sides relative to a vertical longitudinal center plane of the convertible top, said link arrangement being pivotably mounted on a main bearing fixed to the vehicle and serving to adjust a convertible-top element between a lifted operating position and a lowered storage position. The link arrangements each comprise a base link which is pivotably mounted to the respective main bearing and a four joint arrangement which comprises a first adjusting link and a second adjusting link which are pivotably connected to the convertible-top element. Moreover, the link arrangements each comprise a coupling element which is a component of the four-joint arrangement and to which the base link, the first adjusting link and the second adjusting link are hinged. The link arrangements each further have a backlite link arrangement which has a first coupling link hinged to the coupling element, said coupling link being connected to one of the adjusting links via a second coupling link so as to couple the four-joint arrangement to the backlite link arrangement in a positively controlled manner.

By using a backlite link arrangement as well as a first coupling link and a second coupling link for positively coupling the four joint arrangement to the backlite link arrangement, the displacement of the convertible-top element during its adjustment in the longitudinal direction of the convertible top can be kept small.

In a special embodiment of the convertible top according to the invention, the adjusting links are pivoted rearward and downward when the convertible-top element is pivoted from the operating position into the storage position. It is also conceivable to pivot the adjusting links forward and downward when lowering the convertible-top element.

Preferably, four fulcrums are formed on the coupling link, the base link being hinged to the coupling link on a side facing away from the coupling link and the adjusting links and the first coupling link being hinged to the coupling link on a side facing towards the coupling link.

It is possible for the first coupling link to engage through a gap between the coupling element and at least one adjusting link when the convertible top is in the operating position.

According to another aspect, the backlite link arrangement can comprise a first backlite link hinged to a backlite frame with its one end and a second backlite link hinged to the other end of the first backlite link, said second backlite link being hinged to the first coupling link via a third coupling link.

It is possible for the third coupling link to have a first section, a second section and third section, and for the first section to enclose an angle of 70° to 110° in conjunction with the second section, and for the second section to enclose an angle of 70° to 110° in conjunction with the third section, said third section being inclined by approximately 60° to 100° with respect to the first section. Due to this, the third coupling link can at least partially engage around a roll cage in an advantageous manner when the convertible-top element is in the storage position. For this purpose, it is not necessary for the third coupling link to touch the roll cage when the convertible-top element is in the storage position.

Furthermore, a backlite arranged on a backlite frame can be pivoted around a backlite axis when the convertible-top element is in the operating position, the backlite link arrangement being hinged to the backlite frame. Due to this, a rear-side storage space of the vehicle can be accessed.

It is possible for at least sections of the backlite frame to rest against a seal surface of a D-pillar or a rear pillar with a seal when the convertible-top element is in the lifted operating position.

It is also possible for at least sections of the convertible-top element to rest against a seal surface of a D-pillar or a rear pillar and/or a longitudinal roof beam with a seal when in its lifted operating position.

According to another aspect of the convertible top, the second coupling link is hinged to the side of the first coupling link facing away from the coupling element and to the side of the respective adjusting link facing towards the coupling element. Thus, the second coupling link is arranged between the first coupling link and the respective adjusting link as viewed in the transverse direction of the vehicle.

A drive wheel drives the base link, for example. In turn, the drive wheel can be driven by an electric motor. Alternatively, it is also possible to drive the base link by means of a hydraulic cylinder.

Moreover, it is also possible for the convertible-top element to be a rear-side convertible-top cassette.

Furthermore, in a special embodiment of the convertible top according to the invention, the convertible-top cassette accommodates a folding-top portion of the convertible top when pivoting into the storage position, said folding-top portion being able to be adjusted between a closed position spanning a vehicle interior and a stowage position opening the vehicle interior toward the top, in which the folding-top portion is accommodated by the convertible top cassette.

According to a further aspect of the invention, a convertible top is proposed, comprising a convertible-top linkage which comprises a link arrangement on both of its two sides relative to a vertical longitudinal center plane of the convertible top, said link arrangement being pivotably mounted on a main bearing fixed to the vehicle and serving to displace a rear-side convertible-top cassette between a lifted operating position and a lowered storage position, said convertible-top cassette accommodating a folding-top area of the convertible top when being displaced in the storage position, said folding-top area being able to be displaced between a closed position spanning a vehicle interior and a stowage position releasing the vehicle interior to the top when in the operating position, the folding-top area being accommodated by the convertible-top cassette when in the stowage position, said convertible-top cassette resting against a seal surface of a rear-side vehicle-body pillar when in the operating position and said convertible-top cassette continuously being arranged on the side of the seal surface facing away from the vehicle surroundings when being lowered from the operating position to the storage position and being arranged at a front side of a rear-side panel of the vehicle superstructure and preferably on a rear side of a roll element extending in the transverse direction of the vehicle.

Other advantages and advantageous embodiments of the subject matter of the invention can be taken from the description, the drawing and the patent claims.

DETAILED DESCRIPTION OF A PREFERRED EMBODIMENT

Figure 1:
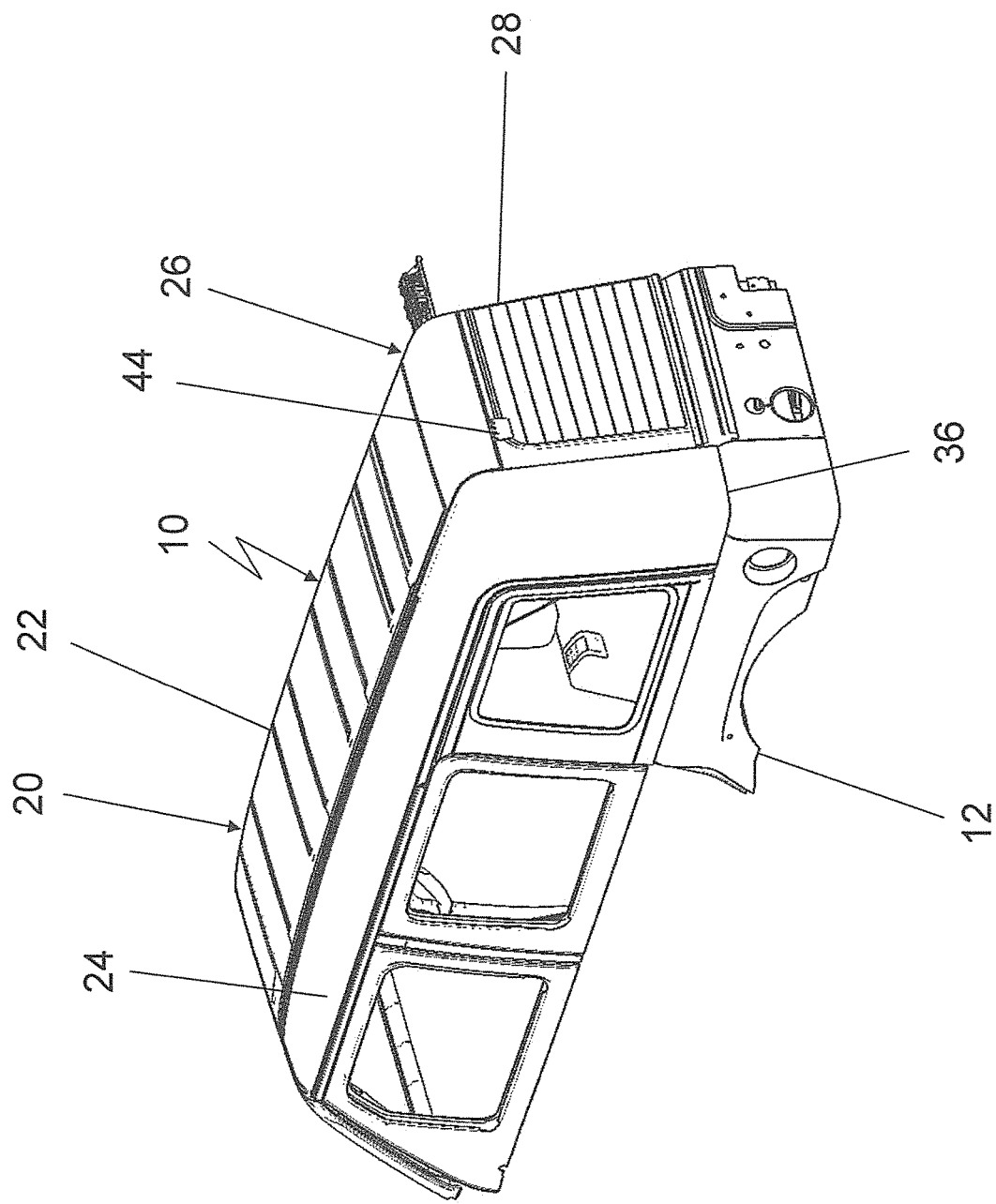
FIG. 1 shows a perspective view of a vehicle superstructure having an adjustable convertible top in its closed position.
Figure 2:
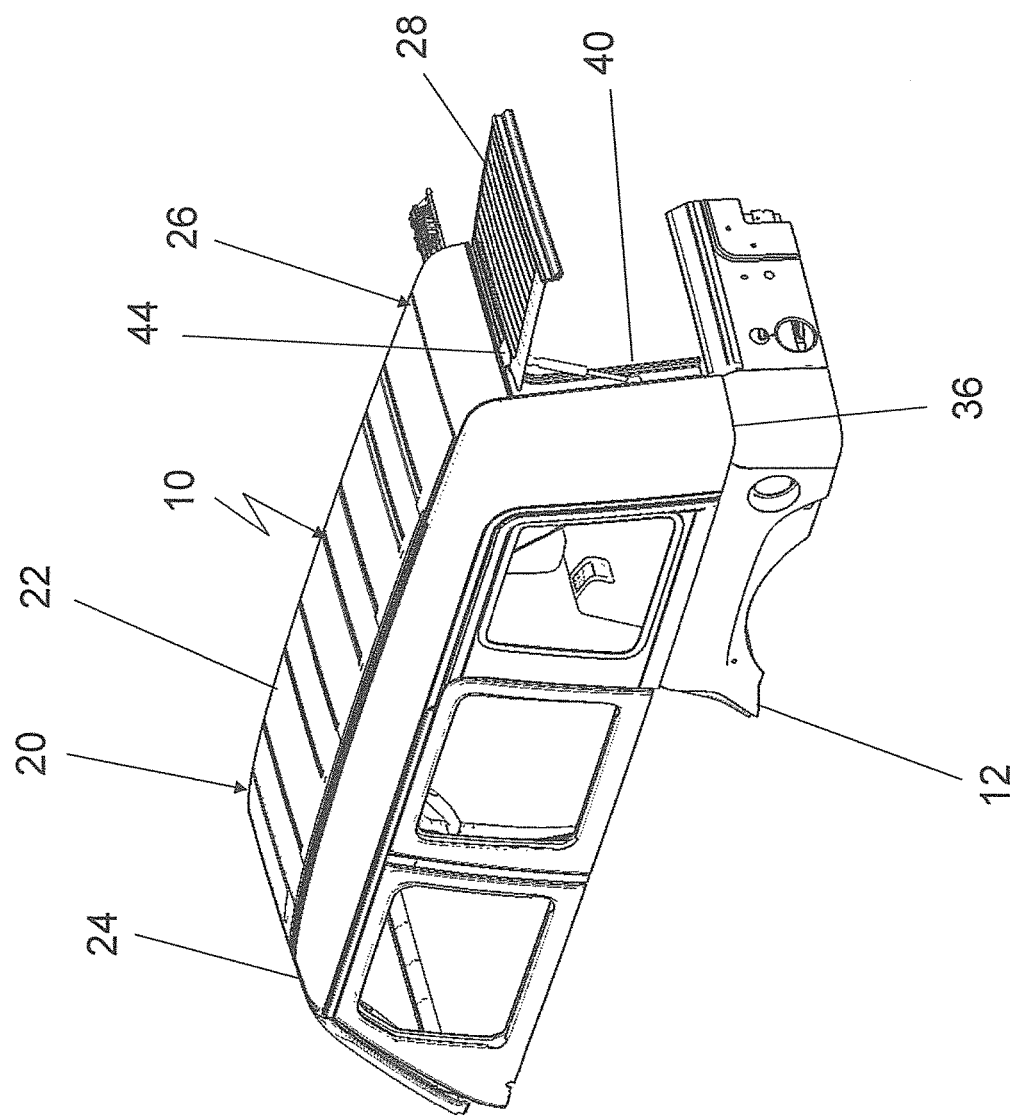
FIG. 2 shows a perspective view of a vehicle superstructure according to FIG. 1 having a pivoted backlite.
Figure 3:
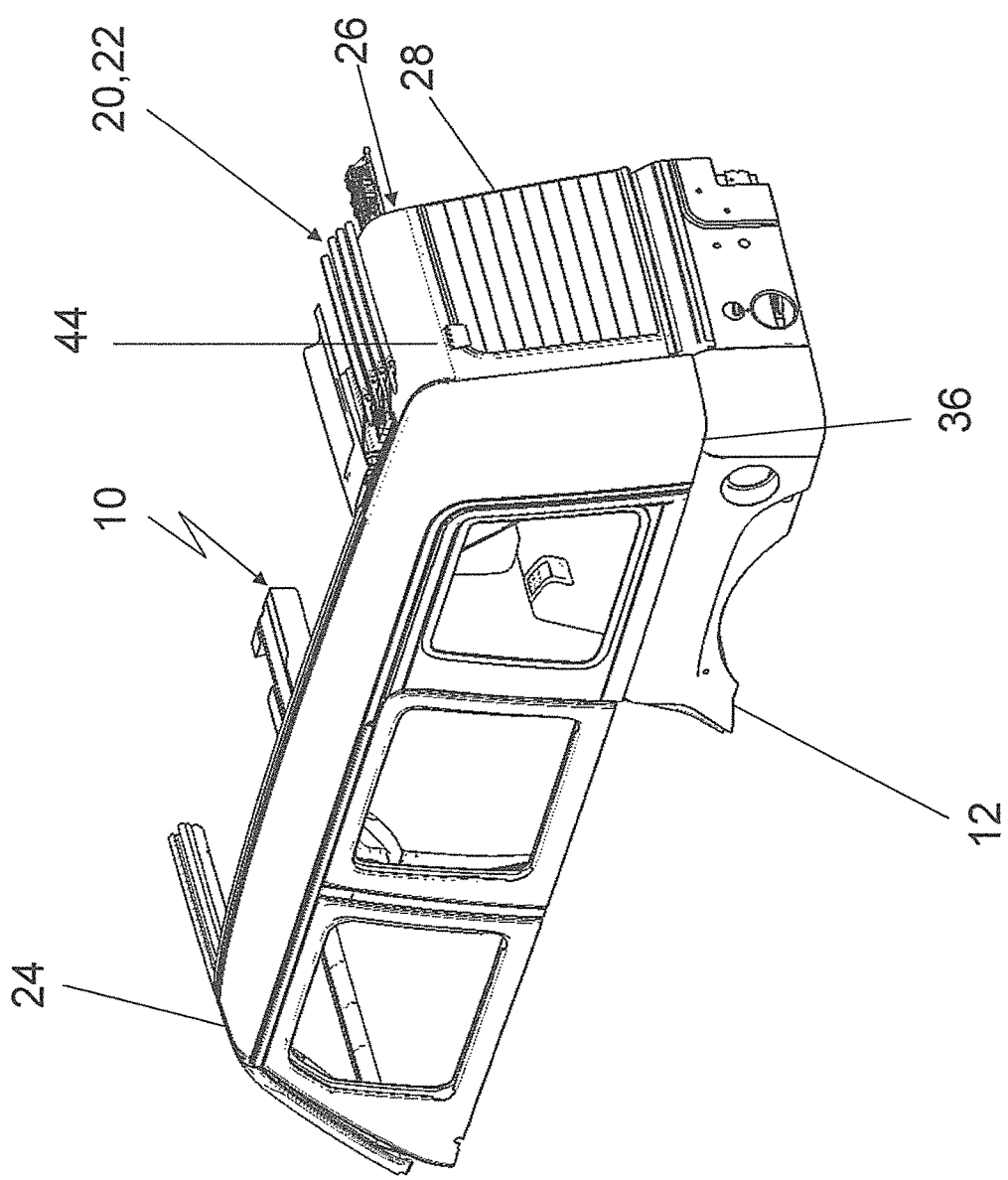
FIG. 3 shows a perspective view of the vehicle superstructure having a folding-top portion of the convertible top when in the stowage position.

In the drawing, a vehicle superstructure 10 is illustrated which is part of a passenger car embodied as an off-road vehicle. The vehicle superstructure 10 comprises a vehicle body 12 which is provided with a roll cage 14. The roll cage 14 comprises a roll bar 16 on both of its two sides relative to a vertical longitudinal center plane of the vehicle, said roll bar 16 extending in the longitudinal direction of the vehicle and supporting itself on the vehicle body 12 in the rear area. The roll bars 16 arranged on both sides are connected to each other via roll braces 18 extending in the vertical direction of the vehicle and together they form the roll cage 14.

The vehicle superstructure 10 is provided with an adjustable convertible top 20 which is formed as a folding top in the broadest sense and has a folding-top portion 22 which forms the actual vehicle roof when in its closed position and which is guided between two lateral longitudinal roof beams 24 which delimit the vehicle roof at the sides and consequently each form a lateral longitudinal roof support. At the rear, the folding-top portion 22 is connected to a convertible-top cassette 26 which represents a convertible-top element, accommodates an adjusting mechanism for the folding-top portion 22 and forms a rear-side corner area of the vehicle roof when in the closed position.

The convertible top 20 further comprises a backlite 28 in an area arranged below the convertible-top cassette 26 when in the closed position, said backlite 28 also being able to be adjusted. The backlite extends in the transverse direction of the vehicle between two D-pillars or rear pillars 36 and is adjacent to them. Due to this, the lateral design of the vehicle is realized in one color and shows only vehicle-body colors. Moreover, the backlite 28 can be pivoted outward and upward with respect to a backlite frame 40 when the convertible-top cassette 26 is in its lifted operating position. For this purpose, two hinges 44 are arranged between the backlite frame 40 and the backlite 28. Due to this, a separate opening function of the convertible top is realized, through which function a luggage space of the vehicle can be accessed. For this purpose, the backlite 28 is to first be pivoted upward, whereby accessing the backlite frame 40 becomes possible via an access accommodation.

The backlite frame 40 and the convertible-top element 26 comprise a seal arrangement 88 which is shown by dashed lines in the drawing and rests against seal surfaces of the longitudinal roof beam 24 from the bottom and against sealing surfaces of the D-pillar 36 from the inside. The backlite frame 40 in particular comprises a seal for the backlite at the backlite side, said seal entirely surrounding the access accommodation. Moreover, another seal is provided for the convertible-top cassette 26 and for the D-pillars 36 at the backlite frame 40. The seal section of the backlite frame 40 for the convertible-top cassette 26 rests against a seal surface on an inner side of the convertible-top cassette 26. Moreover, the convertible-top cassette 26 comprises a seal for the longitudinal roof beams 24 and D-pillars 36.

Figure 5:
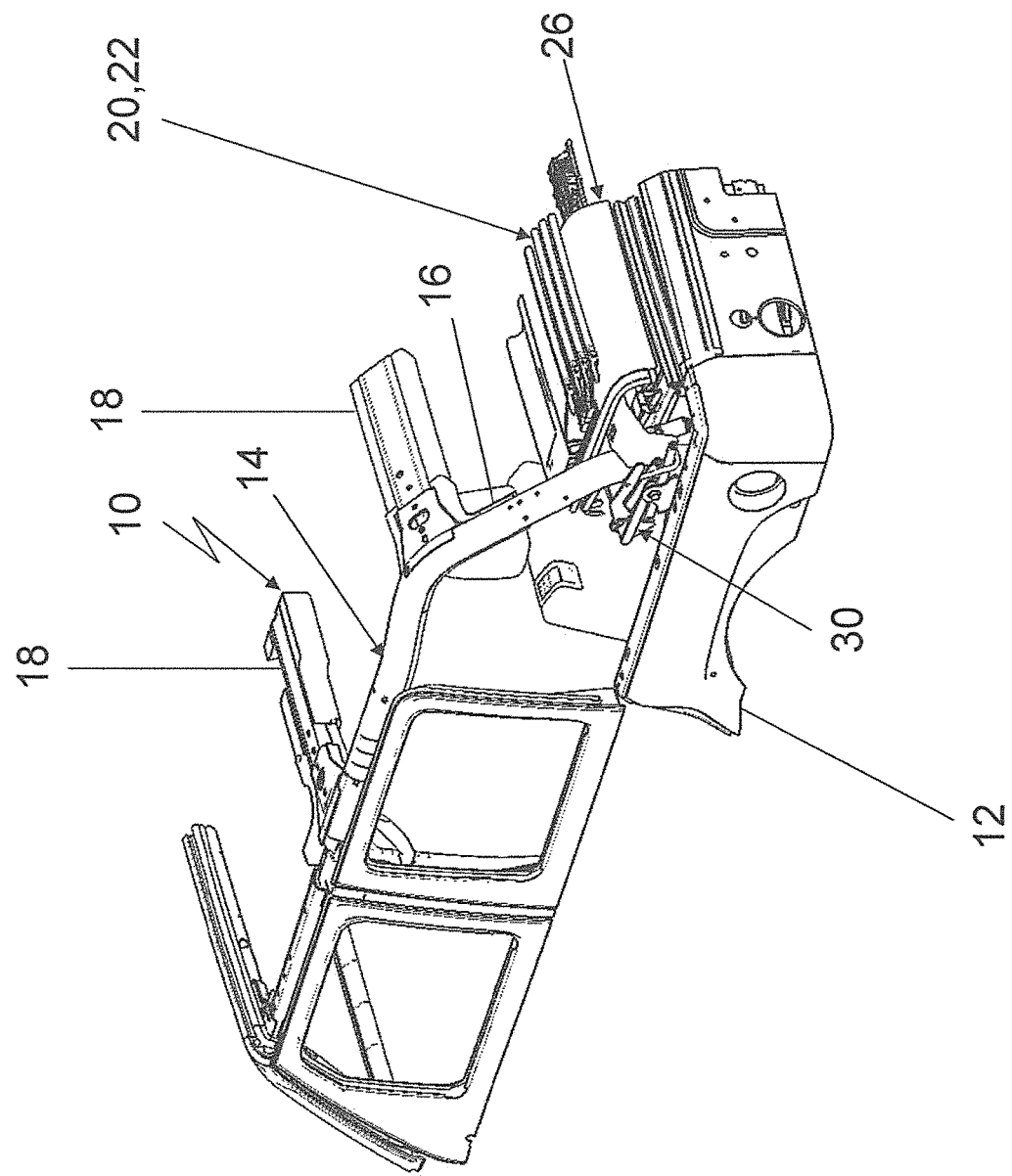
FIG. 5 shows a view according to FIG. 4, though without a roof side beam or a D-pillar.
Figure 6:
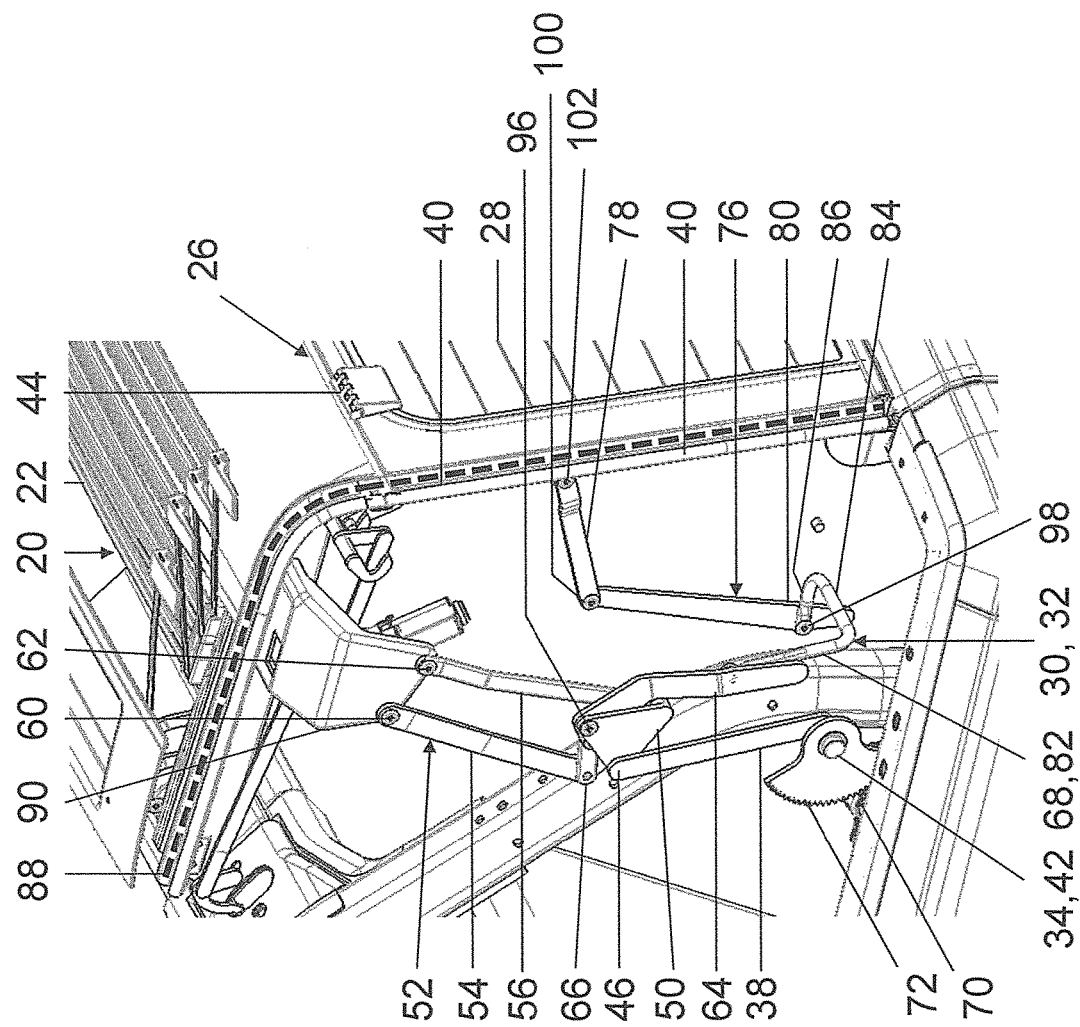
FIG. 6 shows a view according to FIG. 3, though without a roof side beam or a D-pillar.

As FIG. 1 shows, the longitudinal roof beams 24 can be formed and removed in one piece in conjunction with the respective D-pillar 36, as shown in an exemplary manner in FIG. 5.

Figure 4:
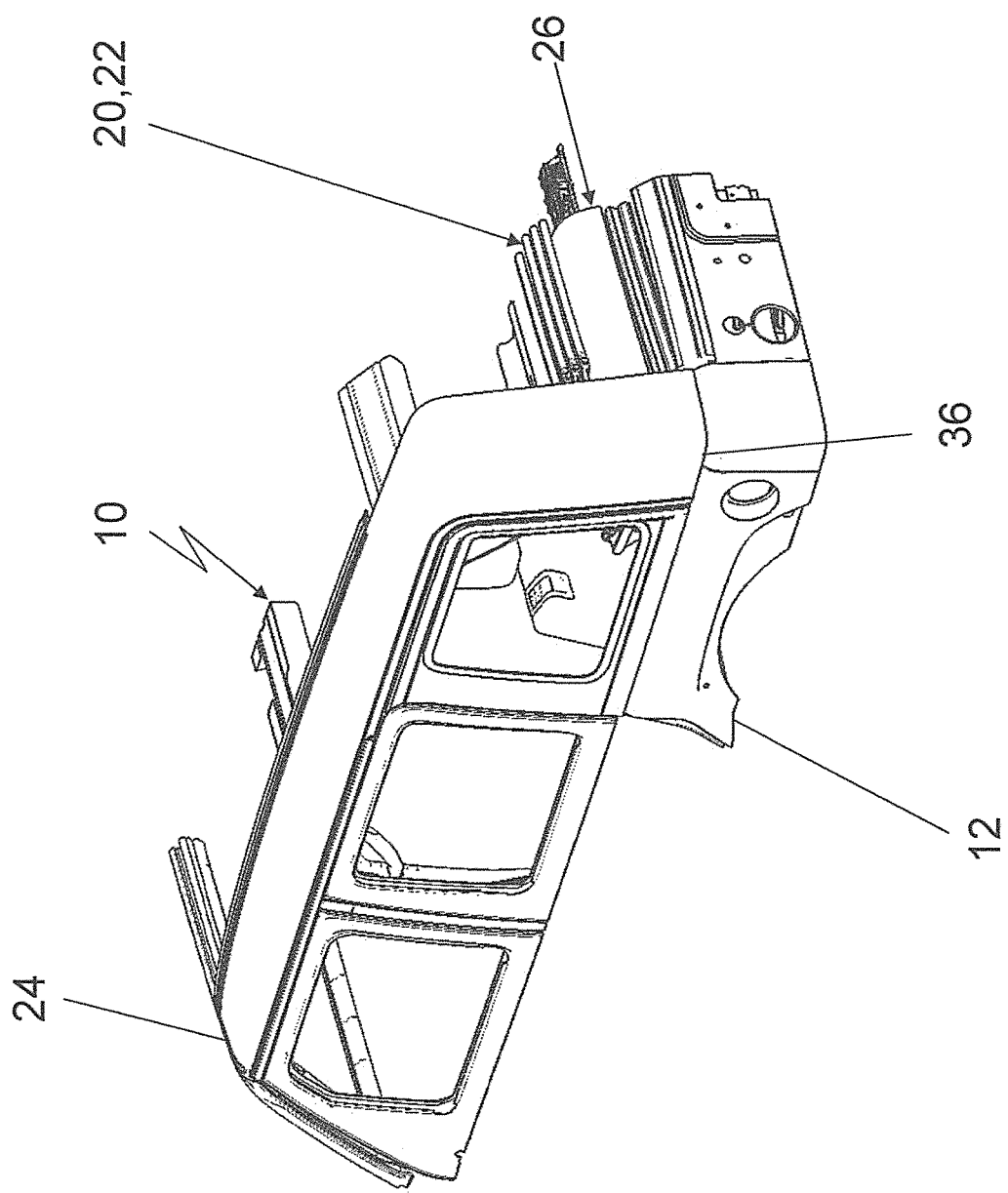
FIG. 4 shows a perspective view of the vehicle superstructure having the adjustable convertible top when in its storage position.
Figure 8:
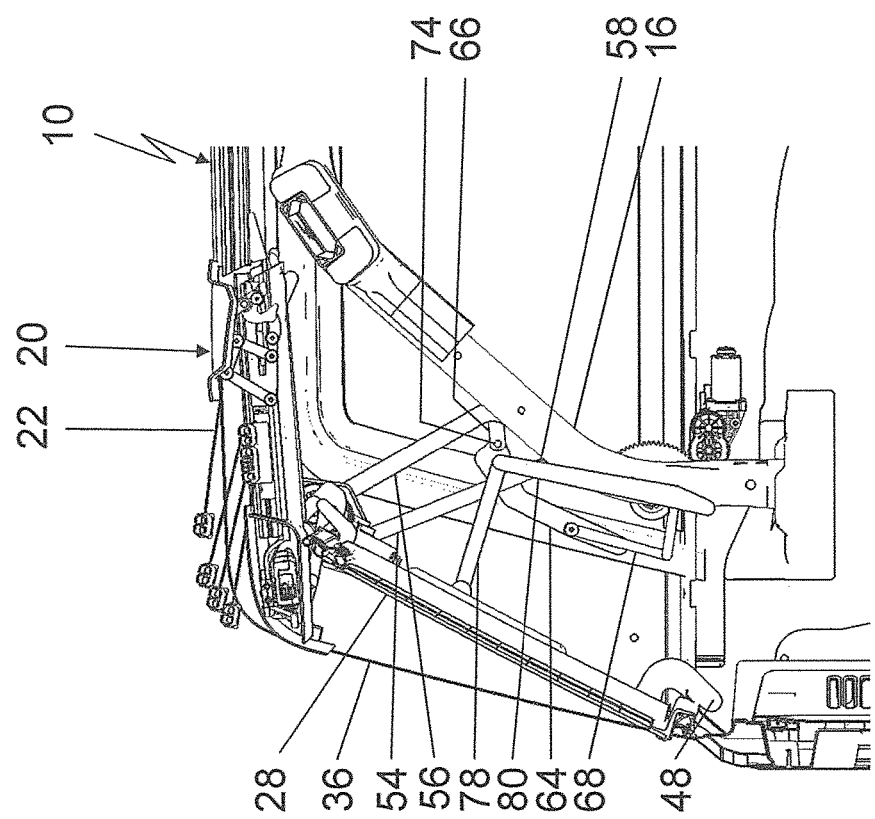
FIG. 8 shows a detailed view of the link arrangement when the convertible-top element is being adjusted.
Figure 9:
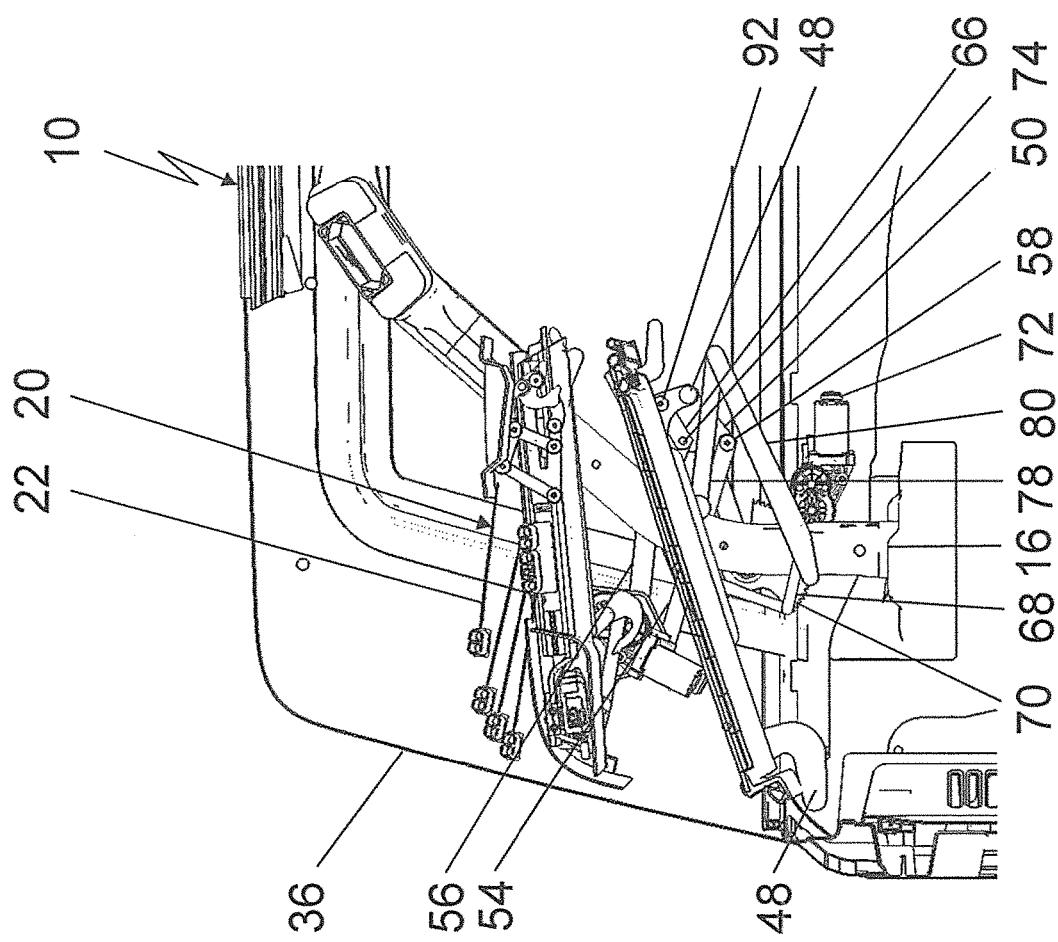
FIG. 9 shows a detailed view of the link arrangement when the convertible-top element is being adjusted into another position.

In order to bring the convertible top 20 from the closed position illustrated in FIG. 1 into the storage position illustrated in FIG. 4, the folding-top portion 22 is first moved in the rearward direction into the convertible-top cassette 26 so that the folding-top portion 22 takes up a stowage position and the convertible-top cassette 26 can be adjusted in conjunction with the folding-top portion 22 from its lifted operating position. In the lowered storage position, the unit formed by the folding-top portion 22 and the convertible-top cassette 26 is accommodated in a rear-side convertible-top storage space. In order to be able to lower the convertible-top cassette 26, the backlite 28 is folded forward around a lower backlite axis 48, as illustrated in FIGS. 8 and 9.

In order to adjust the convertible top cassette 26, the convertible top 20 comprises a convertible top linkage 30 which is formed mirror-symmetrically with respect to a vertical longitudinal center plane of the convertible top and comprises a link arrangement 32 on both of its two sides which is pivotably mounted on a respective main bearing 34 fixed to the vehicle.

The link arrangements 32 arranged on both sides each comprise a base link 38 which is pivotably mounted on the main bearing 34 via a fulcrum 42. In its end portion facing towards the convertible top cassette 26, the base link 38 is hinged to a coupling link 50 via a fulcrum 46.

Moreover, the link arrangements 32 arranged on both sides each comprise a four-joint arrangement 52 which each comprise a first adjusting link 54, a second adjusting link 56, the coupling element 50 and a control panel 90 of the convertible-top cassette 26. The control panel 90 is fixed to the convertible-top cassette.

The coupling element 50 forms a base for the four-joint arrangement 52 and does so in such a manner that the two adjusting links 54 and 56 are each hinged to the coupling element 50 with one end. In this context, the adjusting link 54 forms a fulcrum 58 with the coupling link 50, whereas the adjusting link 56 is hinged to the coupling element 50 via the fulcrum 48. On their ends facing away from the coupling link 50, the adjusting links 54 and 56 are each connected to the convertible-top cassette 26 via a fulcrum 60 and 62, respectively. A first coupling link 64 is hinged to the coupling element 50 via a fulcrum 96 and engages through a gap between the coupling element 50 and the adjusting link 56 when the convertible-top cassette 26 is in its operating position. Four fulcrums 46, 48, 58 and 74 are formed on the coupling element 50. The base link 38 is hinged to a side facing away from a vertical longitudinal center plane of the convertible top and the adjusting links 54 and 56 and the first coupling link 64 are hinged to a side facing towards a vertical longitudinal center plane of the convertible top. The second coupling link 66 is hinged to the side of the first coupling link 64 facing away from the coupling link 50 and to the side of the adjusting link 54 facing towards the coupling link 50. The second coupling link 66 is hinged to the first coupling link 64 via a fulcrum 74 and to the adjusting link 56 via a fulcrum 92.

The link arrangements 32 arranged on both sides each further comprise a backlite link arrangement 76. The backlite link arrangements 76, in turn, each comprise the first coupling link 64 hinged to the coupling element 50, said first coupling link 64 being connected to the adjusting link 54 via a second coupling link 66. Thus, the four joint arrangement 52 is coupled to the backlite link arrangement 76 in a positively controlled manner. Moreover, the backlite link arrangement 76 comprises a first backlite link 78 hinged to the backlite frame 40 via a fulcrum 102 with its one end as well as a second backlite link 80 hinged to the other end of the first backlite link 78 via a fulcrum 100. The second backlite link 80 is connected to a third coupling link 68 via a fulcrum 98, said third coupling link 68 being hinged to the first coupling link 64 via a fulcrum 94. Due to this, a stable roll cage 14 can be realized since the third coupling link 68 partially surrounds the roll bar 16 when in the storage position. For this purpose, the third coupling link 68 serves as a connecting element between the elements of the link arrangement arranged on the vehicle exterior with respect to the roll bar 16 and the elements of the link arrangement arranged on the vehicle interior with respect to the roll cage 16.

The third coupling link 68 comprises a first section 82, a second section 84 and a third section 86, said first portion 82 enclosing an angle of 70° to 110° in conjunction with the second section 84, and said second section 84 enclosing an angle of 70° to 110° in conjunction with the third section 86. The third section 86 is inclined by approximately 100° with respect to the first section 82.

The link arrangement 32 comprises an electric motor 70 in order to be driven, said electric motor 70 driving a drive wheel 72. The base link 38 is arranged on the drive wheel 72 and registers the adjusting movement into the convertible-top linkage 30.

Figure 7:
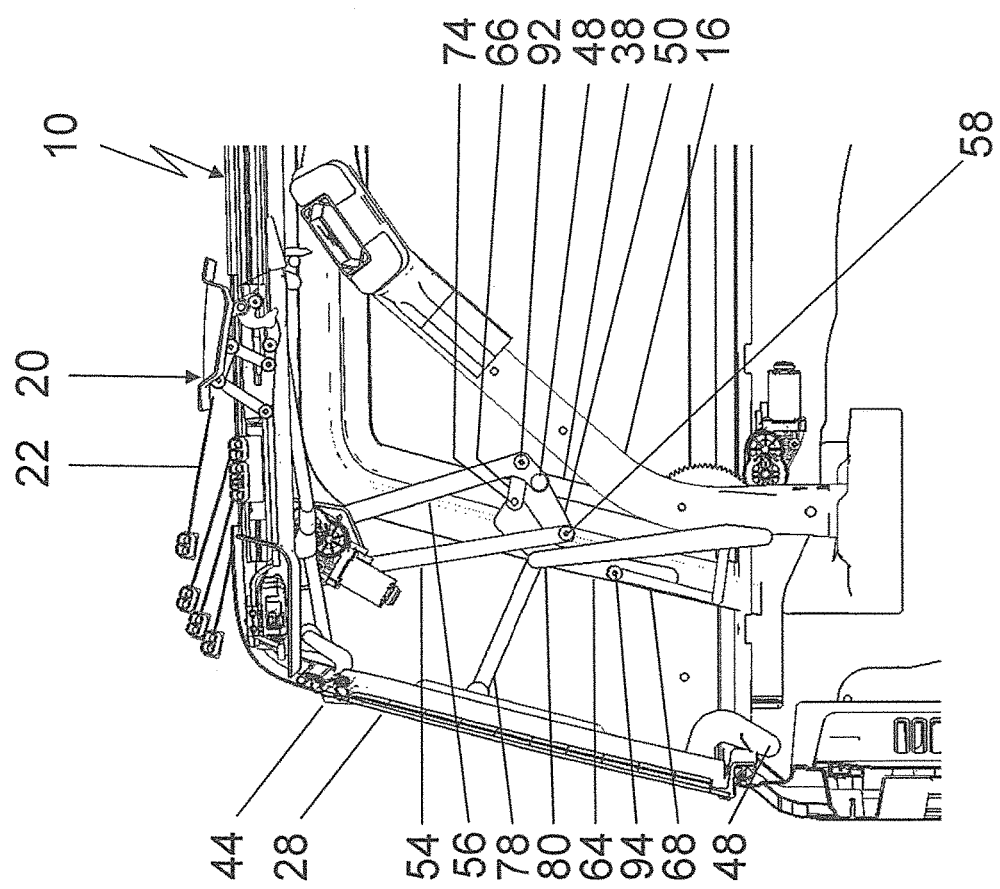
FIG. 7 shows a detailed view of a link arrangement according to FIG. 3 when the convertible-top element is in a lifted operating position.
Figure 10:
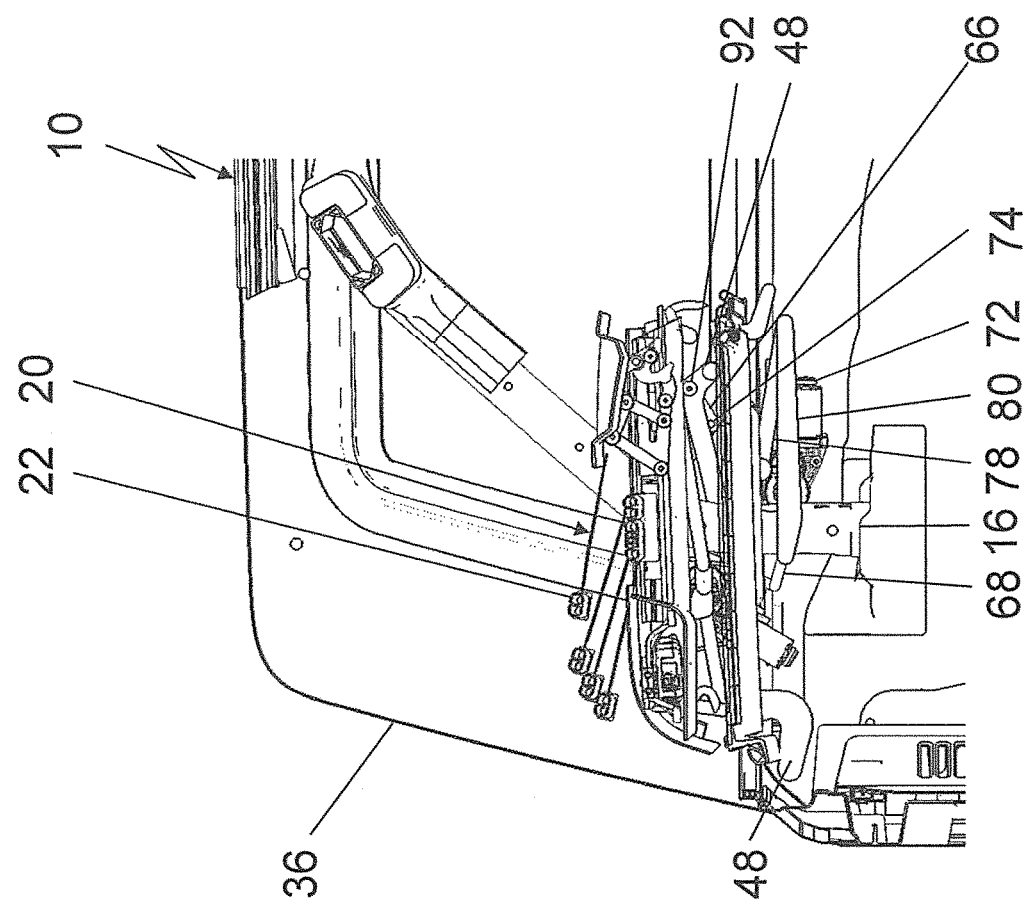
FIG. 10 shows a detailed view of the link arrangement when the convertible-top element is in its lowered storage position.

When adjusting the convertible-top cassette 26 from the operating position illustrated in FIG. 7, which is associated with the closed position of the convertible top 20, into the storage position illustrated in FIG. 10, the drive wheel 72, in the orientation illustrated in FIGS. 8 and 9, is rotated clockwise so that the base link 38 is pivoted forward and downward, i.e. clockwise. In this way, the four-joint arrangement 52 is adjusted via the coupling link 50 and the second coupling link 66, through which means the two adjusting links 54 and 56 are pivoted rearward and downward. By means of this positively controlled, coupled and contrary pivot motion of the base link 38 and the four-joint arrangements 52, the convertible-top cassette 26 can be brought from the operating position illustrated in FIG. 7 into the storage position illustrated in FIG. 10 largely without offset in the longitudinal direction of the vehicle or of the convertible top. Due to this, the convertible-top cassette 26 is lowered to the D-pillars 36 without the seal lines crossing. Moreover, the backlite link arrangement 76 is moved forward in the longitudinal direction of the vehicle due to the second coupling link 66, through which means the backlite 28 is pivoted into the vehicle interior around the backlite axis 28.

The convertible top can thus be stored within the vehicle body 12 and does not take up any space behind the belt line of the vehicle when in the storage position.

LIST OF REFERENCES 10 vehicle superstructure
12 vehicle body
14 roll cage
16 roll bar
18 roll braces
20 convertible top
22 folding-top portion 24 longitudinal roof beam
26 convertible-top cassette
28 backlite
30 convertible-top linkage
32 link arrangement
34 main bearing
36 D-pillar
38 base link
40 backlite frame
42 fulcrum
44 hinge
46 fulcrum
48 backlite axis
50 coupling element
52 four-joint arrangement
54 adjusting link
56 adjusting link
58 fulcrum
60 fulcrum
62 fulcrum
64 first coupling link
66 second coupling link
68 third coupling link
70 electric motor
72 drive wheel
74 fulcrum
76 backlite link arrangement
78 first backlite link
80 second backlite link
82 first section
84 second section
86 third section
88 seal arrangement
90 control panel
92 fulcrum
94 fulcrum
96 fulcrum
98 fulcrum
100 fulcrum
102 fulcrum

The invention claimed is:

1. A convertible top of a vehicle, comprising a convertible-top linkage which comprises a link arrangement on both of its two sides relative to a vertical longitudinal center plane of the convertible top, said link arrangement being pivotably mounted on a main bearing fixed to the vehicle and serving to displace a convertible-top element between a lifted operating position and a lowered storage position, each link arrangement comprising:
a base link which is pivotably mounted on the corresponding main bearing; a four-joint arrangement which comprises a first adjusting link and a second adjusting link which are pivotably connected to the convertible-top element; and a coupling element which is a component of the four-joint arrangement and to which the base link, the first adjusting link and the second adjusting link are hinged; said link arrangements moreover each comprising a backlite link arrangement which comprises a first coupling link hinged to the coupling element, said first coupling link being connected to one of the adjusting links via a second coupling link so as to couple the four-joint arrangement to the backlite link arrangement in a positively controlled manner; and
wherein the convertible-top element is a rearward convertible-top cassette.

2. The convertible top according to claim 1, wherein the adjusting links are pivoted rearward and downward when the convertible-top element is pivoted from the operating position into the storage position.

3. A convertible top of a vehicle, comprising a convertible-top linkage which comprises a link arrangement on both of its two sides relative to a vertical longitudinal center plane of the convertible top, said link arrangement being pivotably mounted on a main bearing fixed to the vehicle and serving to displace a convertible-top element between a lifted operating position and a lowered storage position, each link arrangement comprising:
a base link which is pivotably mounted on the corresponding main bearing; a four-joint arrangement which comprises a first adjusting link and a second adjusting link which are pivotably connected to the convertible-top element; and a coupling element which is a component of the four-joint arrangement and to which the base link, the first adjusting link and the second adjusting link are hinged; said link arrangements moreover each comprising a backlite link arrangement which comprises a first coupling link hinged to the coupling element, said first coupling link being connected to one of the adjusting links via a second coupling link so as to couple the four-joint arrangement to the backlite link arrangement in a positively controlled manner; and
wherein four fulcrums are formed on the coupling element, and wherein the base link is hinged to a side of the coupling element facing away from the vertical longitudinal center plane of the convertible top and the adjusting links and the first coupling link are hinged to a side of the coupling element facing towards the vertical longitudinal center plane of the convertible top.

4. The convertible top according to claim 1, wherein the first coupling link engages through a gap between the coupling element and at least one adjusting link when the convertible-top element is in the operating position.

5. The convertible top according to claim 1, wherein the backlite link arrangement comprises a first backlite link hinged to a backlite frame via its one end and a second backlite link hinged to the other end of the first backlite link, said second backlite link being hinged to the first coupling link via a third coupling link.

6. The convertible top according to claim 5, wherein the third coupling link comprises a first section, a second section and a third section, and the first section encloses a first angle of 70° to 110° in conjunction with the second section, and the second section encloses an angle of 70° to 110° in conjunction with the third section, said third section being inclined by approximately 60° to 100° with respect to the first section.

7. The convertible top according to claim 1, comprising a backlite arranged in a backlite frame, said backlite being able to be pivoted about an axis when the convertible-top element is in the operating position, the backlite link arrangement being hinged to the backlite frame.

8. The convertible top according to claim 7, wherein at least sections of the backlite frame rest against a seal surface of a D-pillar or a rear pillar of the vehicle with a seal when the convertible-top element is in the lifted operating position.

9. The convertible top according to claim 8, wherein at least sections of the convertible-top element rest against the seal surface of a D-pillar or a rear pillar of the vehicle with the seal when in its lifted operating position.

10. The convertible top according to claim 1, wherein the second coupling link is hinged to the side of the first coupling link facing away from the coupling element and to the side of the respective adjusting link facing towards the coupling element.

11. The convertible top according to claim 1, wherein a drive wheel drives the base link.

12. The convertible top according to claim 1, wherein the convertible-top cassette accommodates a folding-roof area of the convertible top when pivoted into the storage position, said folding-roof area being able to be adjusted between a closed position spanning over a vehicle interior and a stowage position opening the vehicle interior toward the top when in the operating position, said folding-roof area being accommodated by the convertible-top cassette when in the stowage position.

13. A convertible top of a vehicle, comprising a convertible-top linkage which comprises a link arrangement on both of its two sides relative to a vertical longitudinal center plane of the convertible top, said link arrangement being pivotably mounted on a main bearing fixed to the vehicle and serving to displace a rear-side convertible-top cassette between a lifted operating position and a lowered storage position, said convertible-top cassette accommodating a folding-top area of the convertible top when being displaced in the storage position, said folding-top area being able to be displaced between a closed position spanning a vehicle interior and a stowage position releasing the vehicle interior to the top when in the operating position, the folding-top area being accommodated by the convertible-top cassette when in the stowage position, said convertible-top cassette resting against a seal surface of a rear-side vehicle-body pillar when in the operating position and said convertible-top cassette continuously being arranged on the side of the seal surface facing away from a vehicle exterior when being lowered from the operating position to the storage position and being arranged at a front side of a rear-side panel of the vehicle structure on a rear side of a roll element extending in the transverse direction of the vehicle.

* * * * *